United States Patent [19]

Gaebe

[11] Patent Number: 5,684,901
[45] Date of Patent: Nov. 4, 1997

[54] APPARATUS FOR MINIMIZING SPHERICAL ABERRATION OF LIGHT BEAM EMITTED INTO AN OPTICAL FIBER AND USING RADIAL DISPLACEMENT OF CORRECTIVE LENS

[75] Inventor: Carl E. Gaebe, Fleetwood, Pa.

[73] Assignee: Lucent Technologies Inc., Murray Hill, N.J.

[21] Appl. No.: 601,218

[22] Filed: Feb. 14, 1996

[51] Int. Cl.$^6$ .................................................. G02B 6/32
[52] U.S. Cl. ................... 385/33; 385/35; 385/93
[58] Field of Search ..................... 372/108; 385/33–35, 385/93

[56] References Cited

U.S. PATENT DOCUMENTS 4,919,506   4/1990   Covey ........................................ 385/35

Primary Examiner—John Ngo

[57] ABSTRACT

An apparatus minimizes the spherical aberration of a light beam emitted into an optical fiber from a light source such as a laser beam. The laser emits a light beam along a path of travel to an optical fiber used in a telecommunication system. A ball lens is positioned within the light beam path of travel, and has a front focal point. The laser is positioned in front of the front focal point such that the light beam emitted by the laser forms an intermediate paraxial focus point. A corrective lens is positioned adjacent the paraxial focus point so that the laser beam is introduced into an optical fiber with minimal spherical aberration and increased coupling efficiency. The corrective lens is displaced radially off-center to compensate for misalignment aberrations and coma.

10 Claims, 6 Drawing Sheets

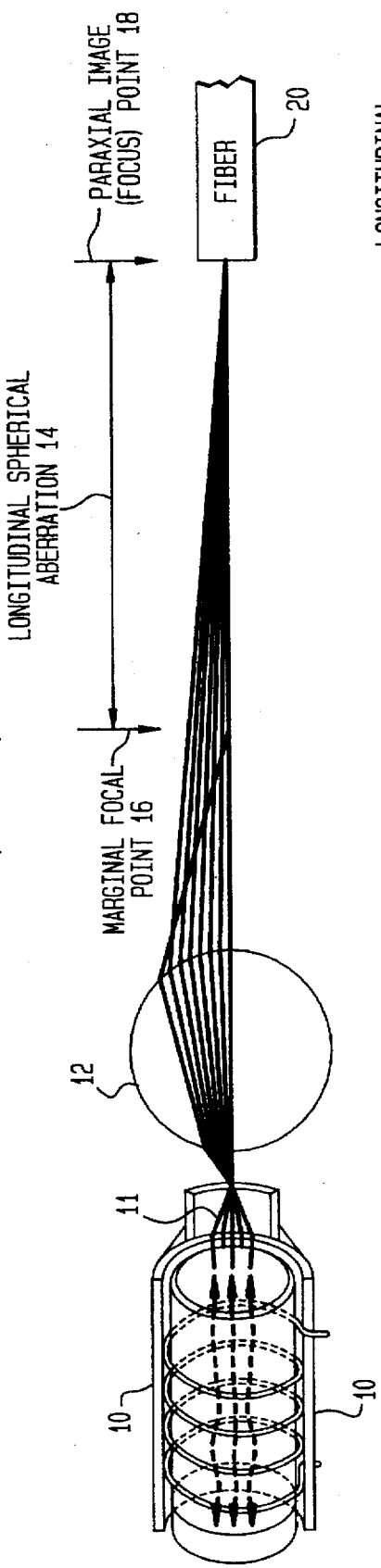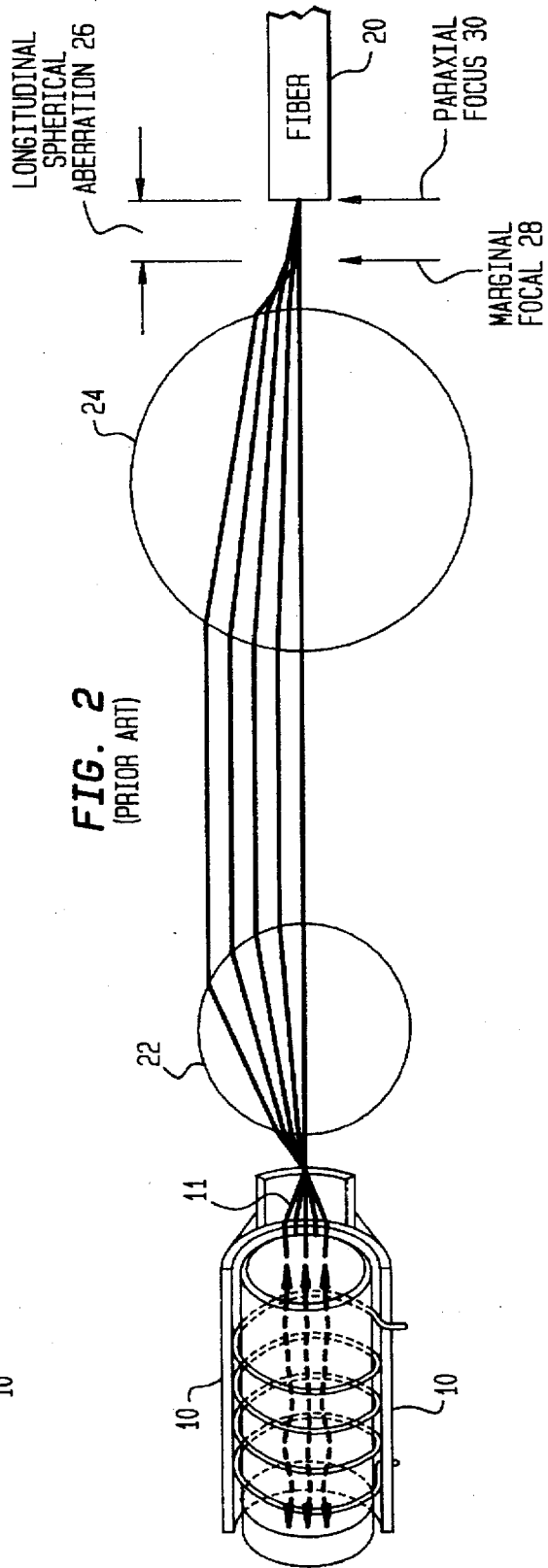

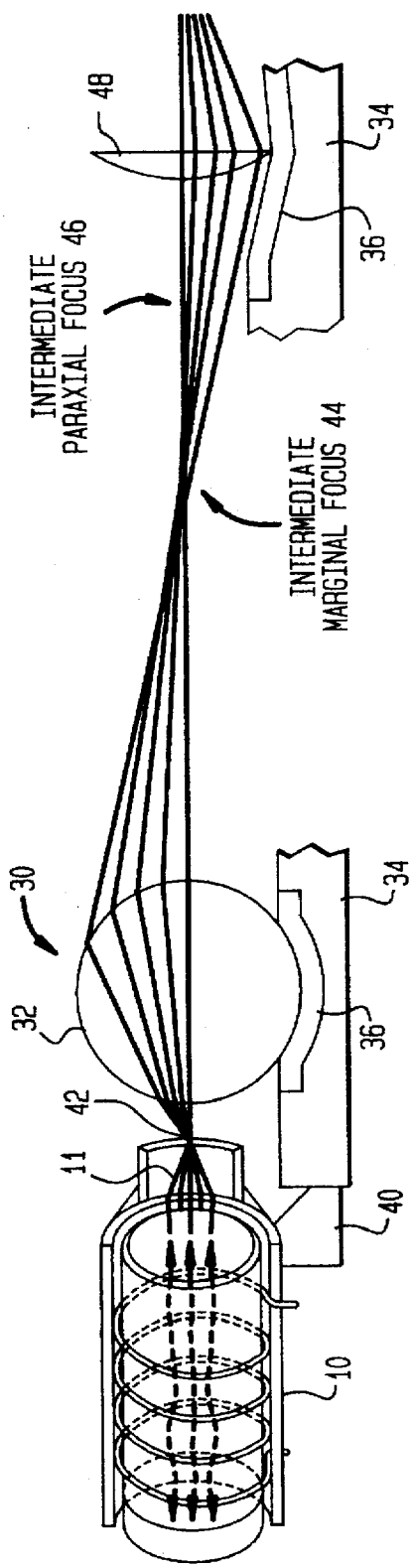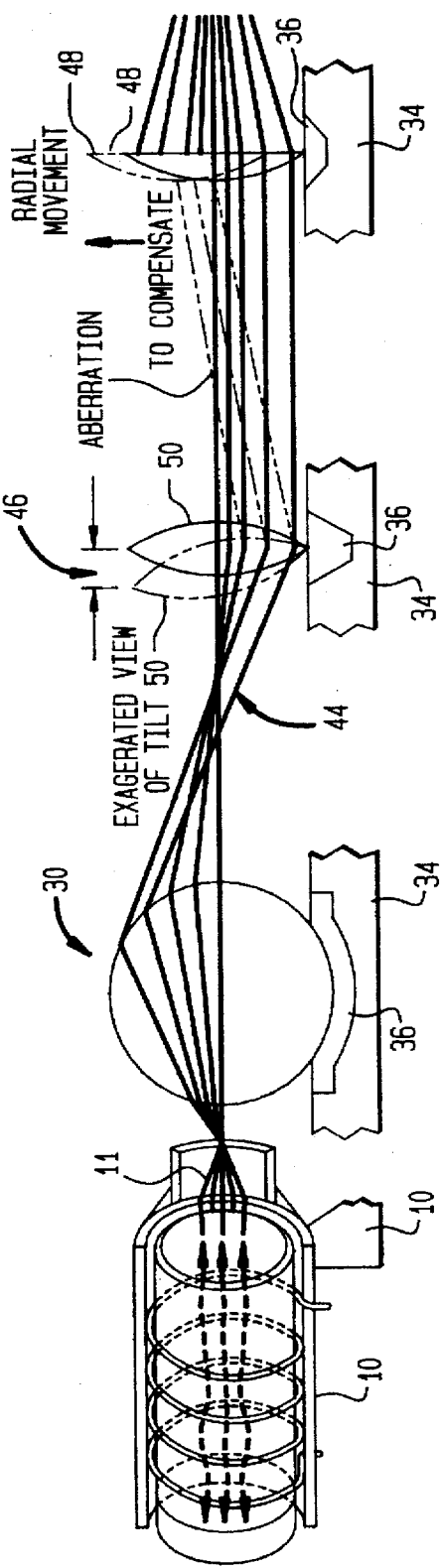

2° TILT OF CORRECTIVE LENS

5° TILTED FIELD LENS

10 μm RADIAL CHIP MISALIGNMENT

FIG. 12
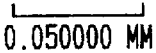
50 μm RADIAL
OF FIELD LENS
0.050000 MM
FIG. 13
COMBINATION MISALIGNMENT OF
-10μm CHIP OFFSET
+125μm FIELD LENS OFFSET
+8° FIELD LENS TILT
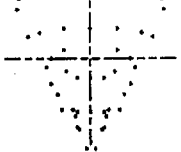
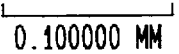
0.100000 MM
FIG. 14
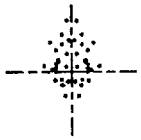
0.005000 MM
FIG. 15
0.005000 MM
FIG. 16
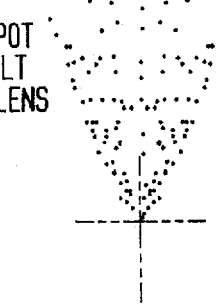
UNCORRECTED SPOT
DIAGRAM 5° TILT
OF CORRECTIVE LENS
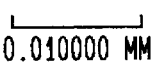
0.010000 MM
FIG. 17
5° TILT OF CORRECTIVE
LENS WITH 30μm DECENTER
FOR COMPENSATION
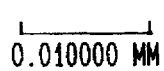
0.010000 MM

APPARATUS FOR MINIMIZING SPHERICAL ABERRATION OF LIGHT BEAM EMITTED INTO AN OPTICAL FIBER AND USING RADIAL DISPLACEMENT OF CORRECTIVE LENS

This application is related to commonly assigned, copending application entitled "Apparatus for Minimizing Spherical Aberration of Light Beam Emitted Into An Optical Fiber," filed Oct. 6, 1995, by the same inventor.

1. Field of the Invention

This Application relates to an apparatus for minimizing the spherical aberration of a light beam emitted from a light source, such as a laser, into an optical fiber.

2. Background Of the Invention

In telecommunication applications, light such as generated from a laser diode, LED or other fibers, is coupled into an optical fiber. The optical fibers could be single or multimode fibers. Problems in coupling efficiency develop when trying to couple short wavelength infrared light from an InGaAsP laser into a single mode fiber.

In one solution, a cleaved fiber is aligned directly to the output facet of a laser. In this simple approach much of light is lost because of the mismatch in the mode size between the laser and the optical fiber. Typically, coupling efficiency in this type of apparatus and method is limited to about 15%. In still another approach, the glass is melted at the tip of the optical fiber to form a spherical lens. The laser light then is pulsed into the formed spherical lens. The spherical surface has aberrations, however, which limits the coupling efficiency to about 50%.

Some optical fibers are produced with hyperbolic lenses, which couple over 70% of the light. A drawback to the use of hyperbolic lenses, however, is the difficulty in achieving, and then maintaining the alignment of the optical fiber to the laser. The tolerance in this alignment is usually about 0.1 microns, a very difficult tolerance to meet in some telecommunication applications. Additionally, the close proximity of the fiber to the laser does not allow other optical devices (e.g. isolators) to be interposed.

A very common solution used presently is the use of high index glass spheres, also referred to as ball lenses.

Ball lenses are inexpensive, easy to align, and therefore desirable, but have low coupling efficiency. A spherical ball lens about 1 mm in diameter can produce about 25% coupling efficiency. Smaller ball lenses can produce higher coupling efficiencies, but the alignment tolerances are reduced proportionately, making adjustments difficult. The symmetry of a ball lens is advantageous nonetheless because all sensitivity to lens tilt is removed. A ball lens is also low in cost, light weight and can be used with a silicon platform on which it can be mounted using glass solders or aluminum oxide bonding methods. The use of ball lenses is limited in many telecommunication applications, however, because of the spherical aberration of the ball lens. Even with a second ball lens mounted in front of the ball lens on a silicon platform, giving a collimated or nearly collimated beam, the coupling efficiency is still only about 50%. Sometimes this coupling disadvantage is outweighed because the tolerances for aligning the ball lens to the laser are usually sufficient to allow the ball lens alignment to be done by purely mechanical or visual means. Another advantage for two ball lenses is that the two lenses can be spaced to accommodate additional optical elements such as splitters, isolators, wave division multiplexers and other components.

In some applications the residual spherical aberration of the ball lens is overcome by applying a thin polymer label bonded to the ball lens and formed into an aspheric shape. Also, the ball lens can be replaced by a molded glass aspheric lens, or a plano convex gradient index lens. Coupling efficiencies of about 70% have been obtained in these methods, which are more desirable efficiencies in technically complex telecommunication applications.

Again, a drawback with using an aspheric lens is the difficult alignment accuracy required. These lenses must be accurately placed so that a laser is very close to the symmetry axis of the lens. This exacting alignment is very difficult to achieve except by an active method in which the laser is powered, and the focused beam actively monitored while the lens is moved accordingly. Once the lens is set in its proper position, the lens must be secured without motion, often requiring sophisticated, expensive laser welding equipment, and heavy, expensive metallic retainers. These metallic retainers also limit the various degrees of movement freedom sometimes required in alignment. Also, the laser and the lens are usually attached to a common metal base to assure stability and permit the parts to be laser welded.

Not only is this system expensive, but the metal parts add weight to the assembly and may reduce the shock resistance of the final package if the assembly has to be placed on a thermoelectric cooler. There is also the additional thermal mass, and the proximity of the laser to metal components could have detrimental effects on the radio frequency characteristics of the device if high speed modulation is required.

In the copending application referenced above, and entitled "Apparatus for Minimizing Spherical Aberration of Light Beam Emitted Into An Optical Fiber," that invention solved the above noted problems by using a ball lens as a first lens element for receiving the light beam emitted by a laser or other light source, and downstream optics for reducing the aberration of light directed at an optical fiber in a telecommunications application. However, with some misalignment errors, such as when a lens is tilted or a chip radially misaligned, the aberration is not compensated. Such aberrations result in coma, i.e., where the image of a point lying off the axis presents a comet-shaped appearance.

It would be advantageous and desirable to compensate for coma resulting from lens tilt and misalignment.

SUMMARY OF THE INVENTION

The present invention solves the above noted problems by displacing the corrective lens radially off-center to compensate for misalignment aberrations and coma.

In accordance with the present invention, a laser emits a light beam along a path of travel to an optical fiber. A ball lens is positioned within the path of travel of the light beam. A corrective lens is positioned within the light beam path of travel. The corrective lens has an aspherical surface that is positioned so that the laser beam light is introduced into an optical fiber with minimal spherical aberration and increased coupling efficiency to an optical fiber. The ball lens has a from focal point and the laser is positioned in front of the front focal point such that the light beam emitted by the laser forms an intermediate paraxial focus after the ball lens. The corrective lens is positioned beyond the paraxial focus. To compensate for misalignment aberrations and coma, the corrective lens is radially off-center a sufficient mount to act as compensation to the coma.

BRIEF DESCRIPTION OF THE DRAWINGS

The advantages, benefits and features of the present invention will be appreciated more fully from the following description, with reference to the accompanying drawings in which:

FIG. 1 is a schematic view showing the longitudinal spherical aberration created by a ball lens used alone when coupling a light beam from a laser into an optical fiber.

FIG. 2 shows the reduced spherical aberration when the arrangement shown in FIG. 1 is used with a second ball lens.

FIG. 3 is a schematic view showing one lens arrangement of the present invention using the ball lens as a first lens and a aspheric corrective lens.

FIG. 4 is another view similar to FIG. 3 showing a field lens placed near the intermediate focus point between the ball lens and the corrective lens, and also showing the corrective lens radially off-center to compensate for the coma resulting from the tilting of the field lens.

FIG. 12 is a spot diagram with a 50 μm radial offset of the field lens.

FIG. 13 is a spot diagram with the combination of a misaligned chip offset, a field lens offset, and a field lens tilt.

FIGS. 14 and 15 are corrected spot diagrams using displacement of the corrective element.

FIG. 16 is a spot diagram showing a five degree (5°) tilt of the corrective lens.

FIG. 17 is a spot diagram where the corrective lens has 30 μm off-center for compensation of its five degree (5°) tilt.

DETAILED DESCRIPTION OF THE INVENTION

Figure 5:
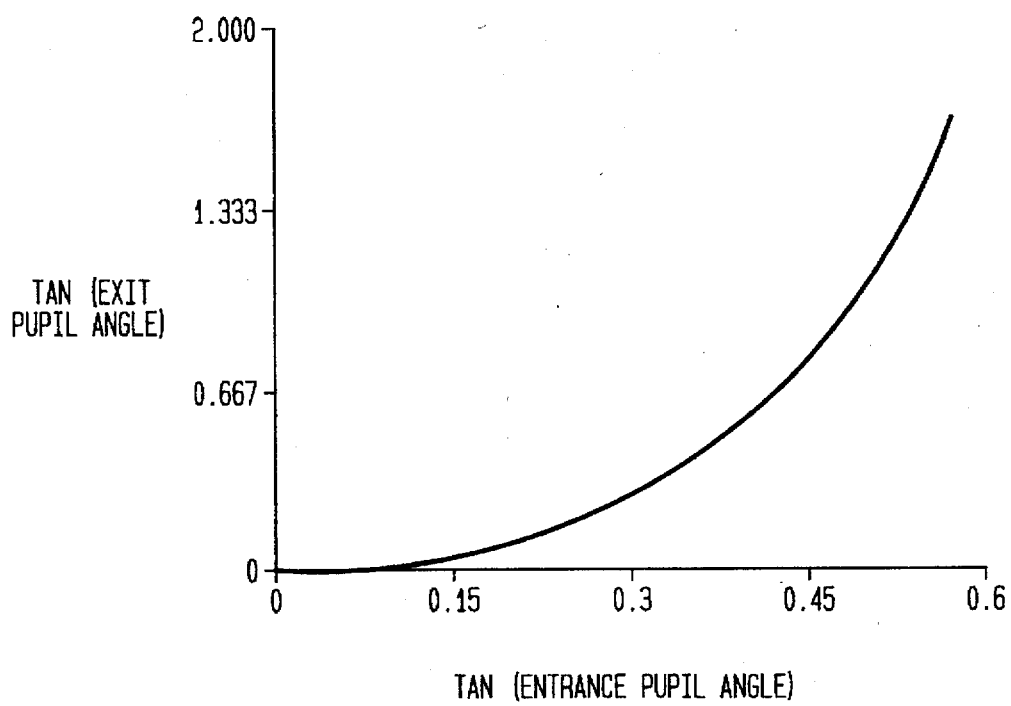
FIG. 5 shows a pupil distortion plot using the lens configuration shown in FIG. 3.
Figure 6:
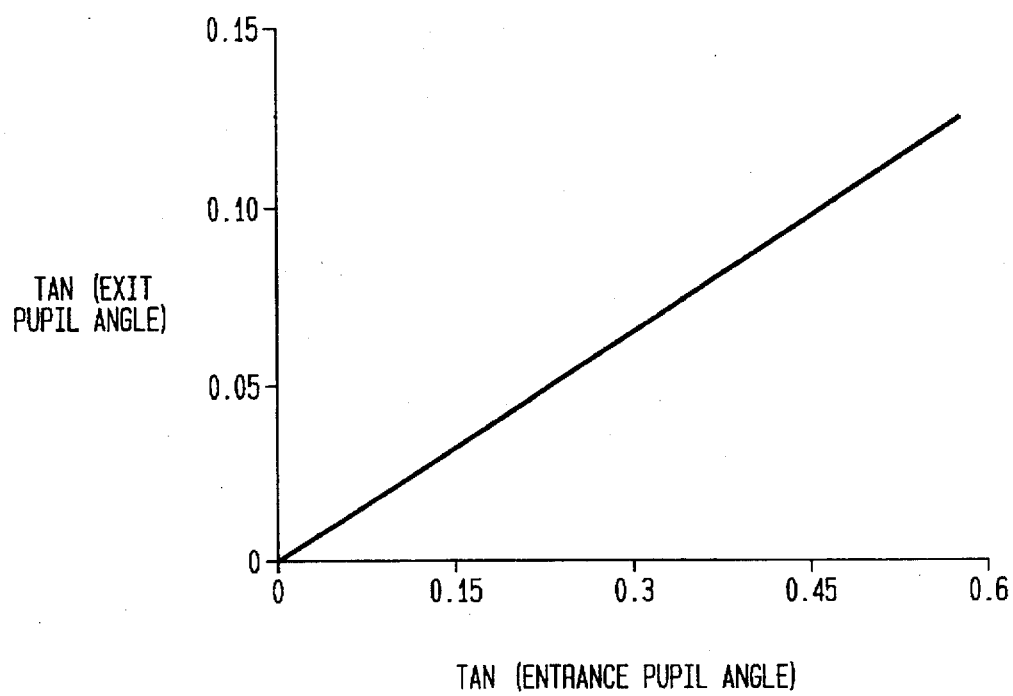
FIG. 6 shows a pupil distortion plot using the lens configuration shown in FIG. 4.

In accordance with the present invention, a ball lens is used as a first lens positioned after a laser, while also having increased coupling efficiency with minimal spherical aberration of light directed at an optical fiber. To compensate for coma and other spherical aberrations, the corrective lens is displaced radially off-center.

Referring now to FIGS. 1 and 2, there are disclosed two prior art lens configurations which have a high spherical aberration of light and are not useful for some advanced telecommunication applications. As shown in FIG. 1, a laser 10 generates a light beam 11 through a ball lens 12, which typically is mounted on a silicon platform (not shown) having an etched photolithography for mounting the ball lens 12 thereon. Typically, the ball lens 12 is about 0.5 mm to about 1.0 mm in diameter, but in some applications, could be much larger. As shown in FIG. 1, the ball lens 12 produces a longitudinal spherical aberration indicated by the line labeled 14, and has a marginal focal point 16 and a paraxial image point 18 directed at the optical fiber 20. This single lens design has about only a 25% coupling efficiency. FIG. 2 shows an improvement of the single lens design—a double lens design with two respective ball lenses 22, 24. However, this double lens design has only about a 50% coupling efficiency. The longitudinal spherical aberration is shorter than in the single lens design, and indicated by line spacing 26. The marginal focal point 28 paraxial focus point 30 are also closer.

Referring now to FIG. 3, there is illustrated a proposed design in accordance with the present invention using a laser package, indicated generally at 30, which has reduced aberration of light directed onto an optical fiber when a ball lens 32 is used as the first lens. As illustrated, a silicon platform 34 is formed by photolithography and has etchings 36 thereon. These etchings 36 in the silicon platform 34 are used to place the ball lens into its proper location relative to the laser 10. The silicon platform 34 is inexpensive, readily manufacturable by those skilled in the art, and allows accurate placement of ball lenses and other lenses relative to the laser. The silicon platform 34 is mounted to the laser 10 by laser mounting means 40 known to those skilled in the art. The present invention allows the use of this technology without suffering high coupling losses.

As shown in FIG. 3, the ball lens 32 is mounted on the silicon platform 34. The ball lens 32 is typically about 0.5 mm to about 1.0 mm, and has a front focal point indicated generally at 42. The laser 10 is situated outside the front focal point 42 in front of the first ball lens 32 such that an intermediate marginal focus 44 and an intermediate paraxial focus 46 is formed. An aspheric corrective lens 48 is positioned after the intermediate paraxial focus 46. The laser beam light is introduced into the aspheric corrective lens 48, surface and the light coming from the corrective lens 48 has minimal aspherical aberration, and an increased coupling efficiency to the optical fiber than the ball lens configurations shown in FIGS. 1 and 2.

In one embodiment of the invention, the respective lens 32, 48 spacing is about 10 mm and the laser 10 to ball lens gap 32 is about 90 micrometers.

FIG. 5 illustrates a pupil distortion graph resulting from the lens arrangement of FIG. 3. The quadratic pupil distortion is now a positive value and allows correction of lens aberration to a higher NA. However, the ray heights on the corrective element increase as the square of the entrance pupil NA, and thus the diameter of the corrective lens increases rapidly with NA. Also, larger pupil distortions will require the corrective element to have a very aspheric surface.

To avoid such drawbacks, a field lens 50 can be placed near the intermediate focus 44, 46 as shown in FIG. 4. The field lens 50 is interposed between the ball lens 32 and the corrective lens 48 and reduces or eliminates the pupil distortions of the corrective lens 48. The field lens 50 should be designed so that the back facet of the ball lens 32 will be imaged in the vicinity of the corrective lens 48. The exact placement and radius of curvature of the field lens 50 can be determined by automatic optimization.

Figure 7:
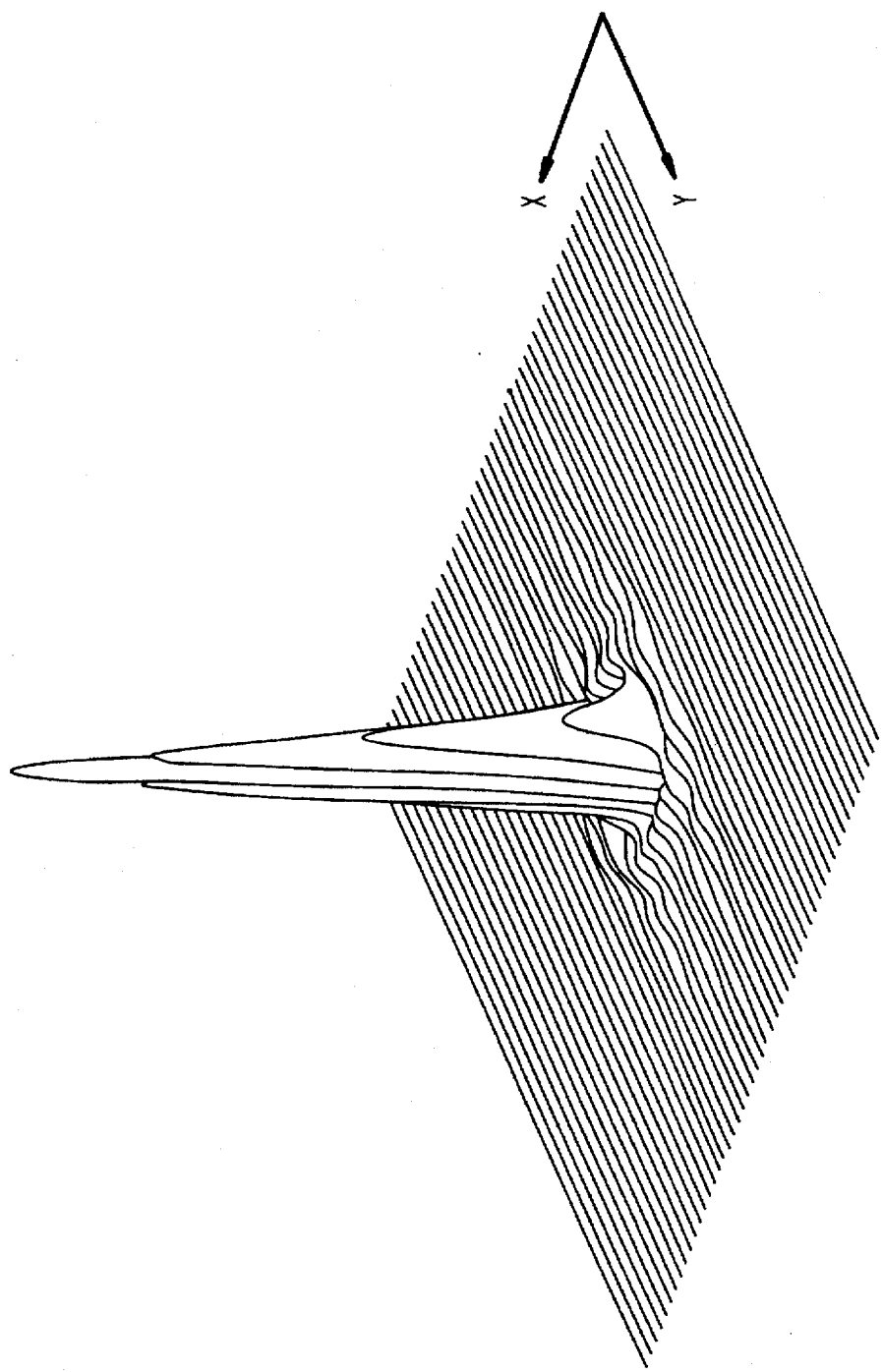
FIG. 7 is a drawing of a diffraction intensity pattern for the lens configuration shown in FIG. 4.
Figure 8:
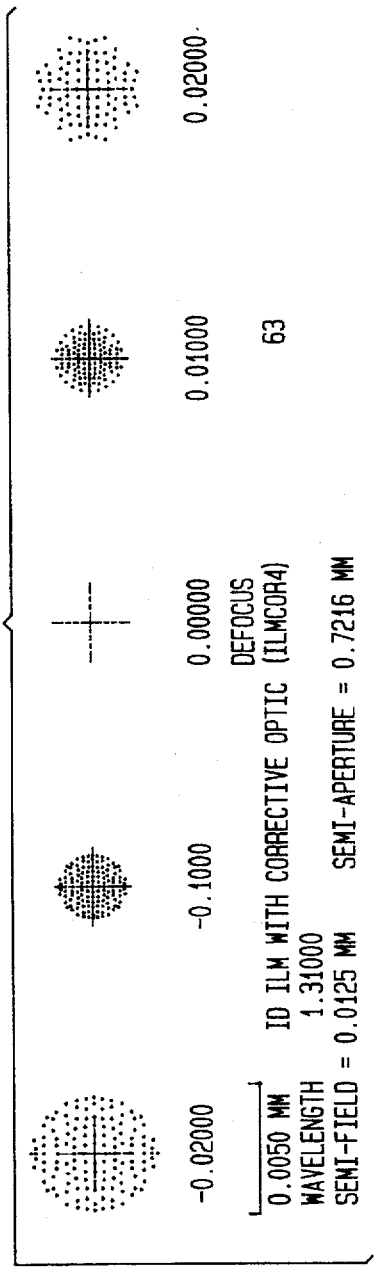
FIG. 8 is a through-focus spot diagram for the lens configuration shown in FIG. 4.

As shown in the plot of FIG. 8, the pupil distortion of the front surface of the corrective lens 48 is virtually eliminated. Automatic optimization is also used to design the corrective lens, which can be given a fourth order correction term. The result is a virtually perfect imaging on the axis. The peak wavefront aberration is better than λ/100 and the RMS spot size is less than 0.05 micrometers. The virtually perfect diffraction intensity at focus is seen in the diffraction intensity pattern of FIG. 7. This design has a calculated Strehl ration greater than 0.99, and a wavefront variance less than $10^{-6}\lambda$. A through-focus spot diagram for the system is shown in FIG. 8 and shows the fractional fields with various differences of the defocus.

It is clearly evident that the pupil distortions and spherical aberrations in laser/optical fiber coupling can now be minimized, even when a ball lens is used as a first element if a proper corrective lens as disclosed in the present invention is used.

In this three element design using a ball lens, a field lens and a corrective lens, it has been found that the systems can be optimized for on-axis performance or the on-axis performance may be sacrificed to improve off-axis performance.

In either case, positioning errors in the system (away from nominal) will introduce unintentional aberrations and reduce the coupling efficiency. Axial misalignment (e.g., lens spacing) will introduce spherical aberrations which can be partially compensated by refocusing the fiber.

However, radial misalignments and tilt of the elements can introduce off-axis aberrations such as coma. One effective way to compensate for coma is to actively align (radially) the corrective lens to introduce an off-setting comatic aberration. This technique has been demonstrated to be effective using optical modeling software.

FIG. 4 shows a schematic view of the field lens tilt, which is compensated by radial movement of the corrective lens 48'. The field lens tilt causes aberration which is compensated by radial movement of the corrective lens 48'.

For example, FIG. 16 illustrates a spot diagram when the corrective lens is tilted five degrees (5°) about the intersection of the axis with the non-planer face. The coma produced by the aberration is shown in FIG. 16. This arrangement shows an RMS spot image of 10.7 µm and a wave front variation of 0.014 waves. After re-adjusting the radial portion of the corrective lens, the on-axis image is corrected to two µm RMS and a wave front variant is reduced to 0.0028 waves.

This type of compensation also works well for the correction of aberrations caused by an off-axis ball lens or an off-axis field lens.

Figure 11:
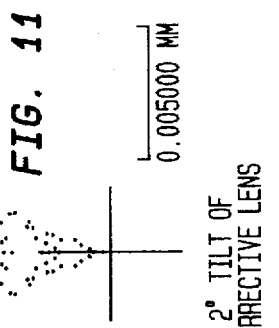
FIG. 11 is a spot diagram with a two degree 2° tilt of the corrective element.
Figure 10:
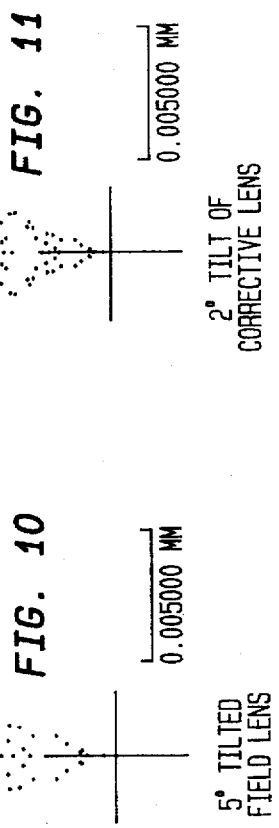
FIG. 10 is a spot diagram with a five degree (5°) tilted lens.
Figure 9:
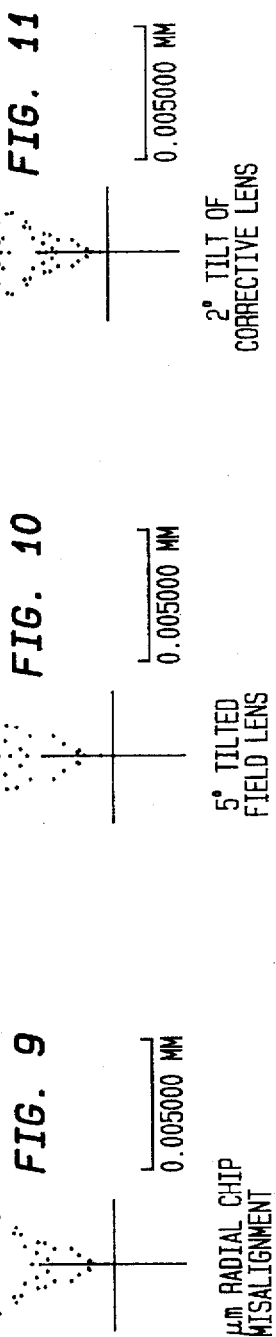
FIG. 9 is a spot diagram with a 10 μm radial chip misalignment.

FIGS. 9–13 show various spot diagrams caused by different misalignments such as a radial chip misalignment in FIG. 9, a tilted field lens in FIG. 10, a tilted corrective lens in FIG. 11, radial off-set of a field lens in FIG. 12, and a combination misalignment of the chip off-set, field lens off-set and field lens shown in FIG. 13. FIGS. 14 and 15 illustrate corrected spot diagrams using displacement of a corrective lens.

It should be understood that the foregoing description of the invention is intended merely to be illustrative thereof, and that other embodiments, modifications and equivalents may be apparent to those skilled in the art without departing from the spirit.

That which is claimed is:

1. A laser package that has reduced aberration of light directed at an optical fiber comprising a laser that emits a light beam along a path of travel from an upstream position downstream to an optical fiber, a ball lens positioned within the light beam path of travel at an upstream location for receiving the light beam, and a corrective lens positioned downstream after the ball lens within the light beam path of travel, said corrective lens having an spherical surface and positioned so that the laser beam light passing through the corrective lens is introduced into an optical fiber with minimal spherical aberration and increased coupling efficiency, and wherein said corrective lens is displaced radially off-center to compensate for misalignment aberrations and coma.

2. The laser package according to claim 1 wherein said ball lens has a front focal point, and the laser is positioned in front of the front focal point such that the light beam emitted by the laser forms an intermediate paraxial focus point after the ball lens, and the corrective lens is positioned adjacent the paraxial focus point.

3. The laser package according to claim 1 wherein the corrective lens has high asphericity.

4. The laser package according to claim 1 wherein the ball lens is about 0.5 mm to about 1.0 mm diameter.

5. The laser package according to claim 1 including a silicon platform on which the ball lens and corrective lens are mounted.

6. The laser package according to claim 5 wherein said silicon platform is mounted to the laser.

7. An apparatus for minimizing the spherical aberration of a light beam emitted from a light source into an optical fiber, comprising a silicon platform having photolithographic etchings thereon for mounting at least a ball lens and corrective lens thereon, a ball lens mounted on said silicon platform for receiving the light beam in a predetermined path of travel, and a corrective lens mounted on said silicon platform after said ball lens and positioned within the light beam path of travel, said corrective lens having an aspherical surface and being positioned so that the light beam passing through the corrective lens is introduced into an optical fiber with minimal aspherical aberration and increased coupling efficiency, and wherein said corrective lens is displaced radially off-center to compensate for misalignment aberrations and coma.

8. The apparatus according to claim 7 wherein the corrective lens has low asphericity.

9. The apparatus according to claim 7 wherein the ball lens is about 0.5 mm to about 1.0 mm diameter.

10. The apparatus according to claim 7 wherein said silicon platform includes means for mounting the silicon platform to the laser.

* * * * *